Patented Sept. 16, 1947

2,427,514

UNITED STATES PATENT OFFICE 2,427,514

CURING OLEFINE-DIOLEFINE COPOLYMERS

Robert R. Sterrett, Borough of Totowa, N. J., and Frederic L. Holbrook, Naugatuck, Conn., assignors to United States Rubber Company, New York, N. Y., a corporation of New Jersey No Drawing. Application February 17, 1944, Serial No. 522,782

5 Claims. (Cl. 260—93)

This invention relates to improvements in curing butyl rubber, which is considered to be a rubber-like copolymer of a mono-olefine and a diolefine, for example, a copolymer of a major proportion of isobutylene and a minor proportion of a diolefine copolymerizable therewith, such as isoprene, butadiene-1,3, etc. See British Patent No. 523,248, and Industrial and Engineering Chemistry, 32, pages 1283 et seq. (1940).

It is known that quinone dioximino compounds, which include such as para-quinone dioxime as well as certain derivatives such as the esters, e. g., paraquinone dioxime dibenzoate, etc., in the presence of selected inorganic and/or organic oxidizing agents, vulcanize the synthetic rubber known as butyl rubber. The vulcanization is quite rapid, and in many instances it results in scorched stocks which causes waste and delay.

Scorch is defined as a premature partial vulcanization of the stock brought about by heat present or developed during processing. A scorched stock is no longer completely thermoplastic and cannot be smoothly sheeted or extruded. Scorch life, as determined by the Mooney plastometer, is a measure of the time during which the stock may be safely processed. The exact time will depend largely on processing temperature and to some extent on the processing operation being carried out. A Mooney scorch resistance (defined below) of ten minutes at 250° F. is considered satisfactory for factory processing of Hevea rubber tread stocks under ideal conditions. A longer time is desirable to provide a factor of safety.

We have found that by adding an aryl polycarboxylic acid or anhydride thereof to a butyl rubber mix which is to be vulcanized with a member of the above referred to quinone dioximino class of non-sulfur vulcanizing agents, that the rate of cure can be greatly reduced and scorching prevented. Based on 100 parts, by weight, of the butyl rubber the amount of the said acid or anhydride is proportioned, according to the amount of the said vulcanizing agent used, to be in amount sufficient to properly set the stock with substantially no scorching. The amounts used may range from 0.5 to about 5 parts of the said acid or anhydride per 100 parts of the synthetic rubber, although in certain cases more may be used.

The retarding effect of the aryl polycarboxylic acid or anhydride is emphasized in the presence of a metal oxide such as zinc oxide, and the retarding effect increases with increase in the zinc oxide, within reasonable limits; the range may be between 0.1 and about 10 parts of the oxide.

The following examples, in which the parts are by weight, illustrate the invention, it being understood that the invention is not to be limited thereto.

EXAMPLE 1

|  | A | B | C |
|---|---|---|---|
| Butyl Rubber | 100.0 | 100.0 | 100.0 |
| Carbon Black | 60.0 | 60.0 | 60.0 |
| Stearic Acid | 3.0 | 3.0 | 3.0 |
| Zinc Oxide | 5.0 | 5.0 | 5.0 |
| Sulfur | 1.5 | 1.5 | 1.5 |
| Para-Quinone Dioxime Dibenzoate | 6.0 | 6.0 | 6.0 |
| Pb$_3$O$_4$ | 10.0 | 10.0 | 10.0 |
| Phthalic Anhydride | | 1.0 | 2.0 |

Mooney plastometer scorch resistance at 250° F.[1]

|  | A | A | C |
|---|---|---|---|
| Minutes | 8 | 12½ | 15 |

[1] Time at which the rate of increase of the Mooney viscosity reaches a value of two units per minute at 250° F.

This example shows the effect on scorch of phthalic anhydride when Pb$_3$O$_4$ is used as the activator for para-quinone dioxime dibenzoate.

EXAMPLE 2

|  | D | E |
|---|---|---|
| Butyl Rubber | 100.0 | 100.0 |
| Carbon Black | 60.0 | 60.0 |
| Stearic Acid | 3.0 | 3.0 |
| Zinc Oxide | 5.0 | 5.0 |
| Sulfur | 1.5 | 1.5 |
| PbO$_2$ | 6.0 | 6.0 |
| Para-quinone Dioxime Dibenzoate | 6.0 | 6.0 |
| Phthalic Anhydride | | 1.0 |

Scorch test at 239° F.

| Time in Minutes | D | | E | |
|---|---|---|---|---|
| | Lb./sq. in. Tensile | Percent Elong. at Break | Lb./sq. in. Tensile | Percent Elong. at Break |
| 10 | 75 | -------- | 40 | 2,400+ |
| 30 | 600 | 980 | 100 | 1,478 |
| 50 | 1,050 | 706 | 310 | 836 |

The above recipe is similar to Example 1 except that the $Pb_3O_4$ was replaced by $PbO_2$.

EXAMPLE 3

| | F | G |
|---|---|---|
| Butyl Rubber | 100.0 | 100.0 |
| Carbon Black | 60.0 | 60.0 |
| Stearic Acid | 3.0 | 3.0 |
| Zinc Oxide | 5.0 | 5.0 |
| Sulfur | 1.5 | 1.5 |
| Para-quinone Dioxime | 2.0 | 2.0 |
| $Pb_3O_4$ | 10.0 | 10.0 |
| Phthalic Anhydride | -------- | 2.0 |

Scorch test at 239° F.

| Time in Minutes | F | | G | |
|---|---|---|---|---|
| | Lbs./sq. in. Tensile | Percent Elong. at Break | Lbs./sq. in. Tensile | Percent Elong. at Break |
| 10 | 1,100 | 915 | 580 | 995 |
| 30 | 1,350 | 675 | 1,290 | 715 |
| 50 | 1,470 | 655 | 1,340 | 665 |

This sample shows that phthalic anhydride is an effective retarder for para-quinone dioxime—$Pb_3O_4$.

Additional examples illustrating the invention are shown in the following Tables I and II.

TABLE I

| Master Batch | Parts |
|---|---|
| GR-I (Butyl rubber) | 100.0 |
| Stearic Acid | 3.0 |
| Cabots #9 (carbon black) | 60.0 |
| $Pb_3O_4$ | 10.0 |
| | 173.0 |

Recipe

| | H | I | J | K | L | M | N | O | P |
|---|---|---|---|---|---|---|---|---|---|
| Above M. B. | 173.0 | 173.0 | 173.0 | 173.0 | 173.0 | 173.0 | 173.0 | 173.0 | 173.0 |
| 3-Nitrophthalic acid | | 2.0 | | | | | | | |
| Trimesic Acid | | | 2.0 | | | | 2.0 | | |
| Terephthalic acid | | | | 2.0 | | | | 2.0 | |
| Phthalimide | | | | | 2.0 | | | | 2.0 |
| Kadox (zinc oxide) | | | | | | 5.0 | 5.0 | 5.0 | 5.0 |
| Para-quinone dioxime | 2.0 | 2.0 | 2.0 | 2.0 | 2.0 | 2.0 | 2.0 | 2.0 | 2.0 |

Unaged tensiles @ 10 lbs./sq. in. steam pressure

| Cure in minutes | Per cent Elong. | T | E | S | T | E | S | T | E | S | T | E | S | T | E | S | T | E | S | T | E | S | T | E | S | T | E | S |
|---|---|---|---|---|---|---|---|---|---|---|---|---|---|---|---|---|---|---|---|---|---|---|---|---|---|---|---|---|
| 10 | 300 | 470 | | | 380 | | | 470 | | | 500 | | | 480 | | | 450 | | | 410 | | | 350 | | | 330 | | |
| | 500 | 1,150 | | | 800 | | | 1,060 | | | 1,050 | | | 1,140 | | | 1,000 | | | 1,060 | | | 800 | | | 850 | | |
| | Break | 1,700 | 700 | 40 | 1,630 | 975 | 37 | 1,480 | 660 | 38 | 1,580 | 715 | 37 | 1,700 | 716 | 36 | 1,570 | 720 | 45 | 1,530 | 743 | 36 | 1,390 | 775 | 42 | 1,410 | 760 | 42 |
| 30 | 300 | 640 | | | 700 | | | 550 | | | 700 | | | 630 | | | 600 | | | 590 | | | 530 | | | 550 | | |
| | 500 | 1,370 | | | 1,460 | | | 1,260 | | | 1,540 | | | 1,360 | | | 1,310 | | | 1,260 | | | 1,290 | | | 1,260 | | |
| | Break | 1,850 | 726 | 43 | 1,980 | 685 | 35 | 1,700 | 685 | 30 | 1,720 | 625 | 30 | 1,850 | 650 | 40 | 1,760 | 700 | 32 | 1,730 | 693 | 31 | 1,550 | 615 | 30 | 1,710 | 693 | 30 |
| 50 | 300 | 650 | | | 630 | | | 600 | | | 740 | | | 750 | | | 650 | | | 610 | | | 660 | | | 600 | | |
| | 500 | 1,400 | | | 1,450 | | | 1,400 | | | 1,540 | | | 1,470 | | | 1,480 | | | 1,750 | | | 1,500 | | | 1,500 | | |
| | Break | 1,940 | 693 | 33 | 1,810 | 670 | 30 | 1,750 | 663 | 35 | 1,800 | 593 | 21 | 1,920 | 640 | 26 | 1,770 | 653 | 26 | 1,750 | 660 | 27 | 1,660 | 565 | 27 | 1,760 | 680 | 30 |

Unaged tensiles @ 40 lbs./sq. in. steam pressure

| Cure in minutes | Per cent Elong. | T | E | S | T | E | S | T | E | S | T | E | S | T | E | S | T | E | S | T | E | S | T | E | S | T | E | S |
|---|---|---|---|---|---|---|---|---|---|---|---|---|---|---|---|---|---|---|---|---|---|---|---|---|---|---|---|---|
| 10 | 300 | 600 | | | 660 | | | 600 | | | 750 | | | 690 | | | 740 | | | 680 | | | 710 | | | 710 | | |
| | 500 | 1,400 | | | 1,450 | | | 1,400 | | | 1,540 | | | 1,470 | | | 1,480 | | | 1,750 | | | 1,500 | | | 1,500 | | |
| | Break | 1,720 | 510 | 28 | 1,800 | 606 | 28 | 1,790 | 680 | 30 | 1,830 | 593 | 25 | 1,750 | 580 | 25 | 1,760 | 646 | 28 | 1,760 | 593 | 28 | 1,790 | 580 | 36 | 1,840 | 600 | 30 |
| 30 | 300 | 720 | | | 790 | | | 750 | | | 790 | | | 880 | | | 800 | | | 800 | | | 860 | | | 870 | | |
| | 500 | 1,530 | | | 1,650 | | | 1,460 | | | 1,660 | | | 1,580 | | | 1,600 | | | 1,650 | | | 1,620 | | | 1,610 | | |
| | Break | 1,750 | 566 | 25 | 1,720 | 550 | 25 | 1,720 | 593 | 25 | 1,700 | 535 | 25 | 1,740 | 516 | 25 | 1,720 | 530 | 25 | 1,650 | 500 | 21 | 1,710 | 510 | 25 | 1,750 | 516 | 23 |
| 50 | 300 | 730 | | | 750 | | | 780 | | | 810 | | | 850 | | | 790 | | | 800 | | | 870 | | | 900 | | |
| | 500 | 1,550 | | | 1,530 | | | 1,660 | | | 1,630 | | | 1,670 | | | 1,590 | | | 1,600 | | | 1,670 | | | 1,670 | | |
| | Break | 1,800 | 590 | 26 | 1,650 | 510 | 25 | 1,790 | 540 | 25 | 1,750 | 515 | 25 | 1,750 | 523 | 25 | 1,800 | 563 | 25 | 1,700 | 523 | 25 | 1,800 | 550 | 25 | 1,710 | 506 | 25 |

TABLE II

Recipe

| | Q | R | S | T | U | V |
|---|---|---|---|---|---|---|
| Above M. B. | 173.0 | 173.0 | 173.0 | 173.0 | 173.0 | 173.0 |
| Ortho phthalic anhydride | 2.0 | | | | 2.0 | |
| 33-Nitrophthalic Anhydride | | 2.0 | | | | 2.0 |
| Iso-phthalic Acid | | | 2.0 | | | |
| 4-Nitrophthalic Acid | | | | 2.0 | | |
| Kadox (Zinc oxide) | | | | | 5.0 | 5.0 |
| Para-quinone dioxime | 2.0 | 2.0 | 2.0 | 2.0 | 2.0 | 2.0 |

*Unaged tensiles @ 10 lbs./sq. in. steam pressure*

| Cure in minutes | Percent Elong. | T | E | S | T | E | S | T | E | S | T | E | S | T | E | S | T | E | S |
|---|---|---|---|---|---|---|---|---|---|---|---|---|---|---|---|---|---|---|---|
| 10 | 300 | 200 | | | 260 | | | 50 | | | 100 | | | 40 | | | 250 | | |
|  | 500 | 580 | | | 775 | | | 350 | | | 360 | | | 150 | | | 760 | | |
|  | Break | 1,050 | 753 | 56 | 1,175 | 696 | 48 | 350 | 786 | 130 | 960 | 705 | 40 | 640 | 1,036 | 160 | 1,370 | 715 | 40 |
| 30 | 300 | 450 | | | 360 | | | 230 | | | 360 | | | 150 | | | 425 | | |
|  | 500 | 1,160 | | | 1,110 | | | 740 | | | 1,000 | | | 690 | | | 1,120 | | |
|  | Break | 1,380 | 583 | 31 | 1,460 | 640 | 37 | 950 | 635 | 60 | 1,370 | 653 | 28 | 1,190 | 790 | 56 | 1,430 | 620 | 30 |
| 50 | 300 | 540 | | | 500 | | | 420 | | | 570 | | | 280 | | | 520 | | |
|  | 500 | 1,355 | | | 1,330 | | | 900 | | | 1,340 | | | 875 | | | 1,220 | | |
|  | Break | 1,490 | 563 | 35 | 1,500 | 686 | 23 | 1,125 | 603 | 41 | 1,570 | 613 | 28 | 1,390 | 733 | 46 | 1,500 | 615 | 27 |

*Unaged tensiles @ 40 lbs./sq. in. steam pressure*

| Cure in minutes | Percent Elong. | T | E | S | T | E | S | T | E | S | T | E | S | T | E | S | T | E | S |
|---|---|---|---|---|---|---|---|---|---|---|---|---|---|---|---|---|---|---|---|
| 10 | 300 | 720 | | | 510 | | | 520 | | | 480 | | | 545 | | | 725 | | |
|  | 500 | 1,480 | | | 1,320 | | | 1,140 | | | 1,245 | | | 1,240 | | | 1,490 | | |
|  | Break | 1,580 | 520 | 28 | 1,550 | 616 | 30 | 1,360 | 630 | 30 | 1,475 | 610 | 30 | 1,520 | 613 | 33 | 1,650 | 563 | 25 |
| 30 | 300 | 810 | | | 650 | | | 650 | | | 540 | | | 840 | | | 775 | | |
|  | 500 | | | | 1,360 | | | 1,320 | | | 1,290 | | | 1,600 | | | 1,550 | | |
|  | Break | 1,500 | 453 | 31 | 1,500 | 453 | 21 | 1,450 | 536 | 20 | 1,425 | 563 | 20 | 1,600 | 500 | 25 | 1,670 | 550 | 26 |
| 50 | 300 | 840 | | | 710 | | | 650 | | | 680 | | | 860 | | | 760 | | |
|  | 500 | | | | 1,320 | | | 1,360 | | | 1,400 | | | | | | 1,500 | | |
|  | Break | 1,490 | 460 | 20 | 1,525 | 526 | 21 | 1,475 | 540 | 30 | 1,480 | 520 | 26 | 1,600 | 473 | 21 | 1,560 | 506 | 25 |

T=Tensile.   E=Percent elongation at break.   S=Percent set at break.

The ortho-phthalic acid and its anhydride may be used interchangeably and hence are to be considered equivalents of each other.

Having thus described our invention, what we claim and desire to protect by Letters Patent is:

1. A method of reducing the rate of cure of a rubber-like copolymer of a major proportion of a mono-olefine and a minor proportion of a diolefine vulcanized with an oxidizing agent, and a rubber vulcanizing agent which is a quinone dioximino compound selected from the class consisting of quinone dioximes, and esters thereof, which comprises additionally adding to the stock before cure from 0.5 to 5 parts, by weight, per 100 parts of said copolymer, of an aromatic compound selected from the class consisting of aryl polycarboxylic acids, and anhydrides thereof.

2. A method of reducing the rate of cure of a rubber-like copolymer of a major proportion of a mono-olefine and a minor proportion of a diolefine vulcanized with an oxidizing agent, and a rubber vulcanizing agent which is a quinone dioximino compound selected from the class consisting of quinone dioximes, and esters thereof, which comprises additionally adding to the stock before cure from 0.5 to 5 parts, by weight, per 100 parts of said copolymer, of a dicarboxylic acid of the benzene series.

3. A method of reducing the rate of cure of a rubber-like copolymer of a major proportion of a mono-olefine and a minor proportion of a diolefine vulcanized with an oxidizing agent, and a rubber vulcanizing agent which is a quinone dioximino compound selected from the class consisting of quinone dioximes, and esters thereof, which comprises additionally adding to the stock before cure from 0.5 to 5 parts, by weight, per 100 parts of said copolymer, of phthalic acid.

4. A method of reducing the rate of cure of a rubber-like copolymer of a major proportion of a mono-olefine and a minor proportion of a diolefine vulcanized with an oxidizing agent, and a rubber vulcanizing agent which is a quinone dioximino compound selected from the class consisting of quinone dioximes, and esters thereof, which comprises additionally adding to the stock before cure from 0.5 to 5 parts, by weight, per 100 parts of said copolymer, of phthalic anhydride.

5. A method of reducing the rate of cure of a rubber-like copolymer of a major proportion of a mono-olefine and a minor proportion of a diolefine vulcanized with an oxidizing agent, and a rubber vulcanizing agent which is a quinone dioximino compound selected from the class consisting of quinone dioximes, and esters thereof, which comprises additionally adding to the stock before cure from 0.5 to 5 parts, by weight, per 100 parts of said copolymer, of an aromatic compound selected from the class consisting of aryl polycarboxylic acids, and anhydrides thereof, and a metal oxide.

ROBERT R. STERRETT.
FREDERIC L. HOLBROOK.

REFERENCES CITED

The following references are of record in the file of this patent:

UNITED STATES PATENTS

| Number | Name | Date |
|---|---|---|
| 2,311,004 | Thomas | Feb. 16, 1943 |
| 1,871,037 | Cadwell | Aug. 9, 1932 |